US012679224B2

(12) United States Patent   (10) Patent No.: US 12,679,224 B2
Ito et al.   (45) Date of Patent: Jul. 14, 2026

(54) ELECTRIC WORK VEHICLE

(71) Applicant: Kubota Corporation, Osaka (JP)

(72) Inventors: Hirokazu Ito, Sakai (JP); Kentaro Habu, Sakai (JP)

(73) Assignee: Kubota Corporation, Osaka (JP)

( * ) Notice: Subject to any disclaimer, the term of this patent is extended or adjusted under 35 U.S.C. 154(b) by 303 days.

(21) Appl. No.: 18/516,350

(22) Filed: Nov. 21, 2023

(65) Prior Publication Data

US 2024/0217349 A1     Jul. 4, 2024

(30) Foreign Application Priority Data

Jan. 4, 2023     (JP) .................................. 2023-000177

(51) Int. Cl.
B60L 50/60     (2019.01)
B60L 1/00     (2006.01)
B60L 7/10     (2006.01)

(52) U.S. Cl.
CPC .............. B60L 50/60 (2019.02); B60L 1/003 (2013.01); B60L 7/10 (2013.01); B60L 2200/40 (2013.01)

(58) Field of Classification Search
CPC .. B60L 50/60; B60L 1/003; B60L 7/10; B60L 2200/40; B60L 58/12; B60L 58/13; B60L 58/15; Y02T 10/70
See application file for complete search history.

(56) References Cited

U.S. PATENT DOCUMENTS

| | | | | | |
|---|---|---|---|---|---|
| 9,014,940 | B2 * | 4/2015 | Newman | ................. | B60T 10/04 |
| | | | | | 701/70 |
| 2010/0186404 | A1 | 7/2010 | Yasufuku et al. | | |
| 2015/0239474 | A1 | 8/2015 | Nakamura | | |
| 2020/0017043 | A1 * | 1/2020 | Kato | ......................... | B60L 1/00 |
| 2022/0228348 | A1 * | 7/2022 | Vilar | ......................... | B60L 1/00 |
| 2023/0227106 | A1 | 7/2023 | Takaki et al. | | |

(Continued)

FOREIGN PATENT DOCUMENTS

| | | | | | | |
|---|---|---|---|---|---|---|
| CN | 102802999 | B | * | 2/2014 | .............. | B60L 58/24 |
| CN | 104723888 | A | * | 6/2015 | | |
| JP | 2008172927 | A | * | 7/2008 | | |

(Continued)

OTHER PUBLICATIONS

JP-7629144-B2 English Translation (Year: 2025).*

(Continued)

*Primary Examiner* — Michael T. Walsh
(74) *Attorney, Agent, or Firm* — The Webb Law Firm

(57)     ABSTRACT

An electric work vehicle includes a travel device; a first electric motor configured to drive the travel device; a second electric motor configured to drive a pump; a battery configured to supply electric power to the first electric motor; a charging determination section configured to determine whether or not charging of the battery is needed; and a control device configured to control the first electric motor. The control device includes a regeneration control section configured to control regenerated power generated by the first electric motor, and in response to the charging determination section determining that charging of the battery is not needed, the regeneration control section performs control to supply the regenerated power from the first electric motor to the second electric motor.

3 Claims, 3 Drawing Sheets

(56)                    References Cited

U.S. PATENT DOCUMENTS

2024/0014426 A1*    1/2024    Goto ....................... B60L 58/40

FOREIGN PATENT DOCUMENTS

| | | | |
|---|---|---|---|
| JP | 2008280178 | A | 11/2008 |
| JP | 2015162933 | A | 9/2015 |
| JP | 2016104927 | A | 6/2016 |
| JP | 202065469 | A | 4/2020 |
| JP | 202260664 | A | 4/2022 |
| JP | 2022103659 | A | 7/2022 |
| JP | 7629144 | B2 * | 2/2025 ............. B60L 58/26 |

OTHER PUBLICATIONS

JP-2008172927-A English Translation (Year: 2008).*
CN-102802999-B English Translation (Year: 2014).*
CN-104723888-A English Translation (Year: 2015).*

* cited by examiner

ELECTRIC WORK VEHICLE

CROSS-REFERENCE TO RELATED APPLICATION

This application claims priority to Japanese Patent Application No. 2023-000177 filed Jan. 4, 2023, the disclosure of which is hereby incorporated by reference in its entirety.

BACKGROUND OF THE INVENTION

1. Field of the Invention

The present invention relates to an electric work vehicle in which a battery is charged with regenerated power generated from an electric motor.

2. Description of Related Art

The above-mentioned electric work vehicle uses regenerated power generated through brake operation as battery charging power (e.g., see Patent Document 1 (Japanese Patent Publication No. 2020-065469)).

Such electric work vehicles include electric work vehicles that do not charge the battery with regenerated power when charging of the battery is not needed, such as a case where the battery is fully charged. When charging of the battery with regenerated power is not performed, braking control such as deceleration using a regeneration brake is not performed, and for example, braking control using a mechanical brake is performed.

That is, the conventional electric work vehicle includes not only a structure for a regeneration brake, but also a structure for a mechanical brake, and thus is inconvenient in that the number of constituent components therein increases. Also, when charging of the battery is not needed, regenerated power cannot be effectively utilized, such as charging of the battery with regenerated power not being performed, and thus there has been room for improvement.

SUMMARY OF THE INVENTION

In view of the above-described problem to be solved, the present invention aims to provide an electric work vehicle according to which regenerated power can be effectively utilized and the configuration thereof can be simplified.

The electric work vehicle of the present invention includes: a travel device; a first electric motor configured to drive the travel device; a second electric motor configured to drive a pump; a battery configured to supply electric power to the first electric motor; a charging determination section configured to determine whether or not charging of the battery is needed; and a control device configured to control the first electric motor, in which the control device includes a regeneration control section configured to control regenerated power generated by the first electric motor, and in response to the charging determination section determining that charging of the battery is not needed, the regeneration control section performs control to supply the regenerated power from the first electric motor to the second electric motor.

According to this aspect of the invention, even when it is determined that charging of the battery is not needed, regenerated power is supplied to the second electric motor, and therefore the regeneration brake can be used to perform braking control such as deceleration, without using the mechanical brake. That is, the electric work vehicle need not include the mechanical brake, and an increase in the number of components resulting from further including a structure for the mechanical brake can be avoided, which makes it possible to simplify the configuration of the electric work vehicle. Also, even when it is determined that charging of the battery is not needed, regenerated power is supplied to the second electric motor, and therefore regenerated power can be effectively utilized.

In the present invention, it is preferable that the charging determination section determines that charging of the battery is not needed in response to the battery being fully charged.

According to this configuration, in response to the battery being fully charged, it is determined that charging of the battery with regenerated power is not needed, and since charging of the battery with regenerated power is not performed and the regenerated power is supplied to the second electric motor, it is possible to prevent excessive charging of the battery.

In the present invention, it is preferable that the pump is a hydraulic pump configured to pump oil in an oil circulation circuit in which an oil cooler is provided, and the second electric motor is an electric motor configured to drive the hydraulic pump.

According to this configuration, the second electric motor needs a relatively large amount of motive power, and if the regenerated power is a large amount of electric power, the regenerated power can be favorably used to drive the second electric motor.

In the present invention, it is preferable that the pump is a water pump configured to pump cooling water in a cooling water passage in which a radiator is provided, and the second electric motor is an electric motor configured to drive the water pump.

According to this configuration, the second electric motor performs driving with a relatively small amount of motive power, and if the regenerated power is a relatively small amount of electric power, the regenerated power can be favorably used to drive the second electric motor.

DESCRIPTION OF THE INVENTION

Figure 1:
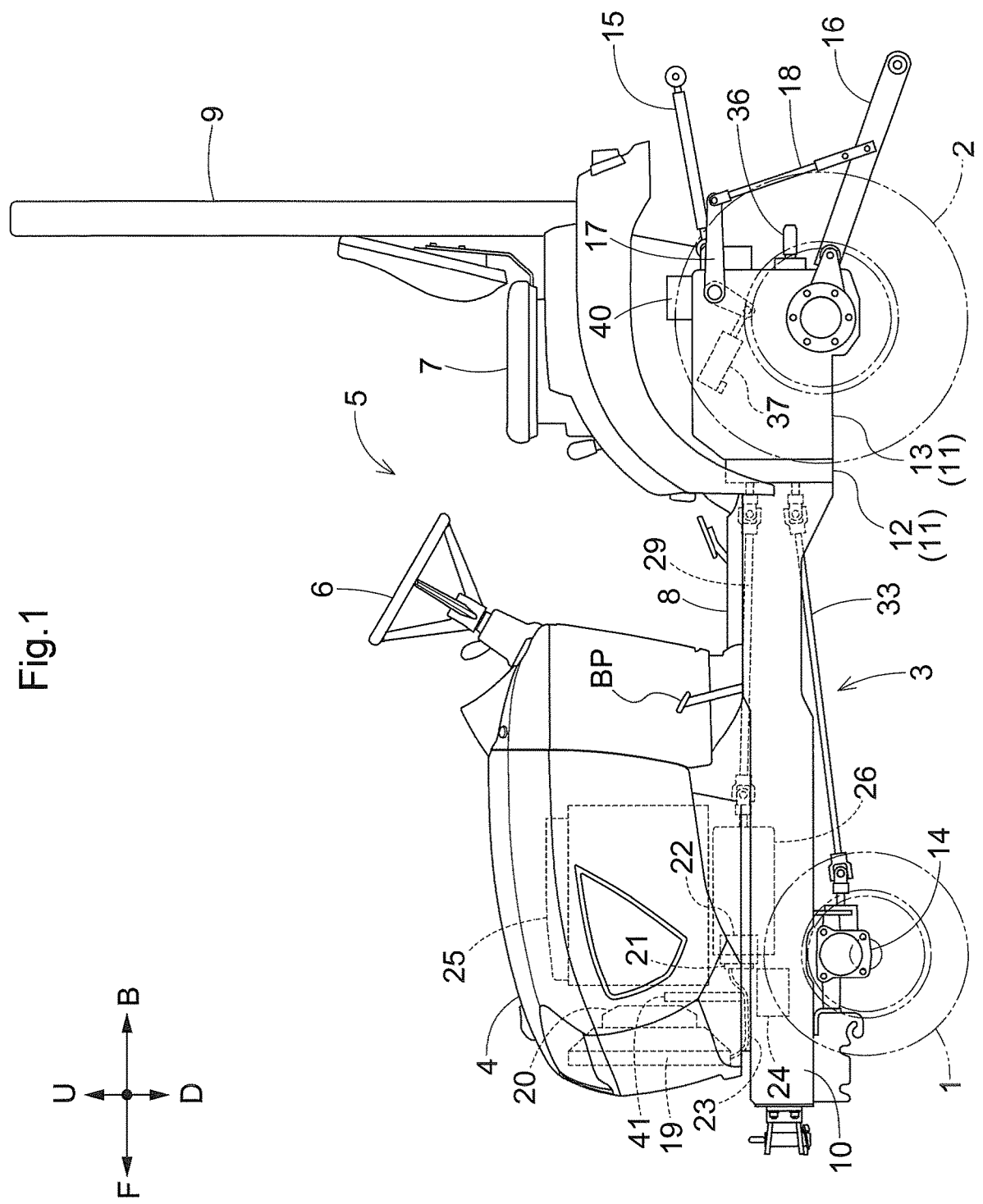
FIG. 1 is a side view of a tractor.

Embodiments for carrying out the present invention will be described with reference to the drawings. In the following description, unless otherwise specified, the direction of arrow F in the drawings is "frontward", and the direction of arrow B is "rearward". In addition, the direction of arrow U in the drawings is "upward" and the direction of arrow D is "downward".

Overall Configuration of Tractor

As shown in FIG. 1, a body 3 is supported by right and left front wheels 1 (corresponding to the "travel device" of the present invention) and right and left rear wheels 2 (corresponding to the "travel device" of the present invention). The body 3 has a front section provided with a hood 4, and rear section provided with a driving section 5. The driving section 5 is provided with a steering wheel 6 for steering the front wheels 1, a driver's seat 7, a floor 8, and a ROPS frame 9.

The body 3 includes right and left body frames 10, a transmission case 11, and the like. The transmission case 11 is formed by connecting a front case 12 and a rear case 13 to each other. The right and left body frames 10 are connected to the transmission case 11 and are arranged below the driving section 5 along a front-rear direction. The transmission case 11 is provided below the driver's seat 7 of the driving section 5.

A front axle case 14 is supported by the front section of the body frame 10, and the right and left front wheels 1 are supported by the front axle case 14. The right and left rear wheels 2 are supported by the transmission case 11 (rear case 13).

A top link 15 and right and left lower links 16 (corresponds to a "link mechanism") are provided at the rear section of the transmission case 11 (rear case 13) in such a manner as to be swingable up and down, and a working device (not shown) such as a rotary tilling device can be connected to the top link 15 and the lower links 16.

The rear section of the transmission case 11 (rear case 13) is provided with right and left lift arms 17, and linking rods 18 are connected between the lift arms 17 and the lower links 16. By swinging the lift arms 17 up and down, the top link 15 and the lower links 16 are moved up and down, and a working device is raised and lowered.

Configuration Inside of Hood

A radiator 19 is provided along an up-down direction and a left-right direction at a front side portion inside of the hood 4. A fan device 20 is provided along the up-down direction and the left-right direction, rearward of the radiator 19.

The fan device 20 is provided with a cooling fan 20a that can rotate about an axis extending in the front-rear direction, and a cooling fan drive motor (not shown) that drives the cooling fan 20a to rotate, and the cooling fan drive motor is driven by electric power of 12 V from the battery 25. The fan device 20 (cooling fan 20a) is provided adjacent to the radiator 19.

A water pump 21 and a water pump motor 22, which is an electric motor for driving the water pump 21, are provided between left and right body frames 10. The water pump 21 pumps cooling water in a cooling water passage 23 in which the radiator 19 is provided. The cooling water is for cooling an inverter 24, a DC-DC converter (not shown), and the like. Note that the inverter 24 is provided on a rear side portion inside of the hood 4. The cooling water is cooled by passing through the radiator 19.

Also, a battery 25 is provided inside the hood 4. A travel motor 26 (corresponding to the "first electric motor" of the present invention) that is supplied with electric power from the battery 25 is provided below the battery 25.

An oil cooler 41 is provided along the up-down direction and the left-right direction at a portion between the fan device 20 and the front section of the battery 25. The oil cooler 41 is for cooling hydraulic oil (oil) of a continuously variable transmission 28 and hydraulic oil of another hydraulic device (not shown).

Configuration of Transmission Case

Figure 2:
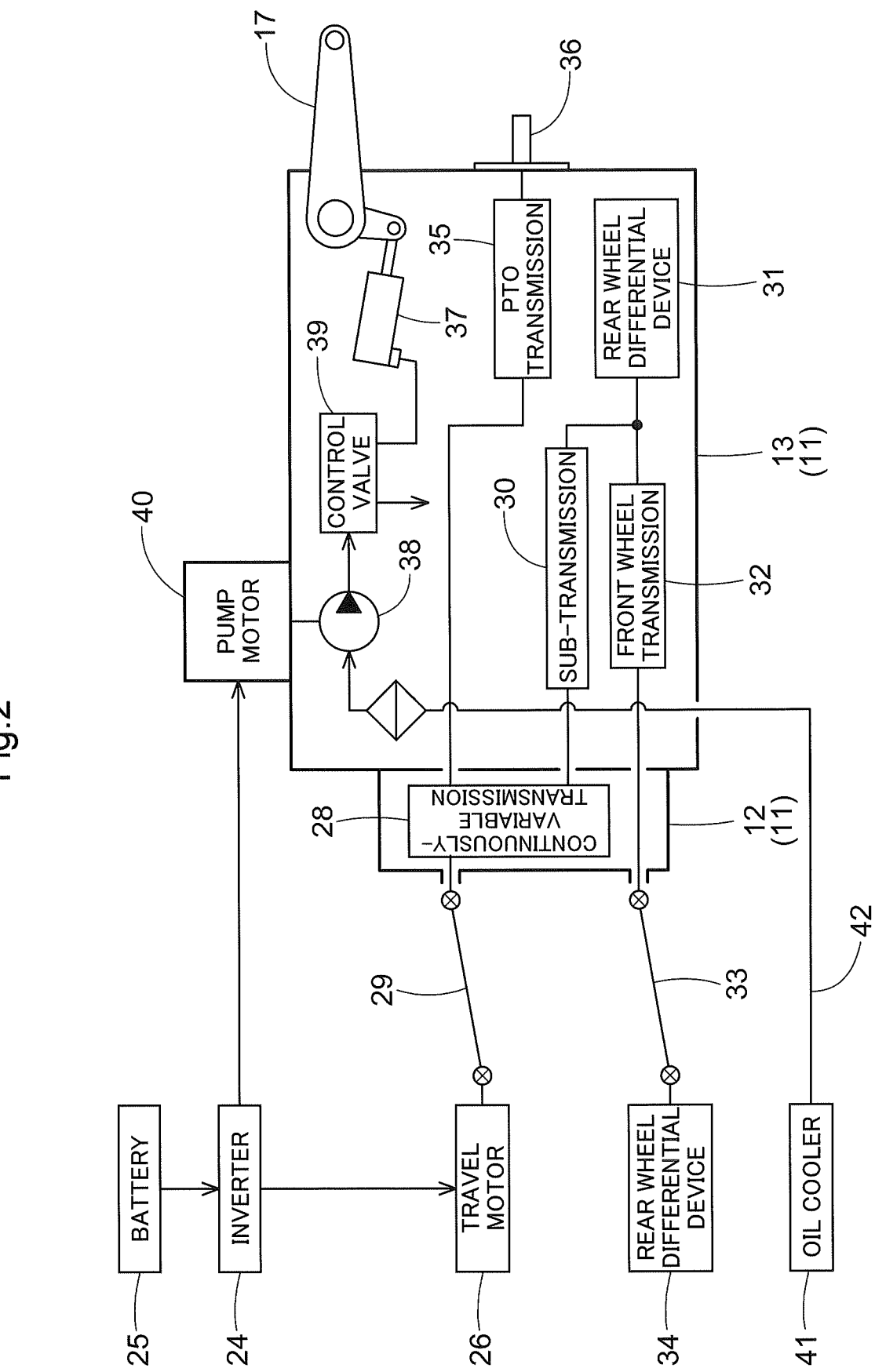
FIG. 2 is a schematic view showing a transmission system from a motor to front wheels and rear wheels.

As shown in FIGS. 1 and 2, a hydrostatic continuously variable transmission 28 is accommodated inside the front case 12 of the transmission case 11, and the motive power of the travel motor 26 is transmitted to the continuously variable transmission 28 via a transmission shaft 29. The continuously variable transmission 28 is capable of steplessly changing a speed to a forward side and a reverse side, and is operated by a speed change pedal (not shown) provided on the floor 8 of the driving section 5.

A sub-transmission 30, a rear wheel differential device 31, and a front wheel transmission 32 are accommodated inside the rear case 13 of the transmission case 11. The motive power shifted by the continuously-variable transmission 28 is transmitted to the sub-transmission 30, and is transmitted from the sub-transmission 30 to the rear wheels 2 via the rear wheel differential device 31.

The motive power branched from between the sub-transmission 30 and the rear wheel differential device 31 is transmitted to the front wheel transmission 32, is transmitted from the front wheel transmission 32 to the front wheel differential device 34 accommodated inside of the front axle case 14 via a transmission shaft 33, and is transmitted from the front wheel differential device 34 to the front wheels 1.

As shown in FIGS. 1 and 2, a PTO transmission 35 is accommodated inside of the rear case 13 of the transmission case 11, and a PTO shaft 36 is provided at the rear section of the rear case 13 of the transmission case 11. When the working device is connected to the top link 15 and the lower links 16, a transmission shaft (not shown) is connected between the PTO shaft 36 and the working device.

When the motive power of the travel motor 26 is transmitted to the continuously-variable transmission 28 via the transmission shaft 29, the motive power of the transmission shaft 29 (motive power that does not undergo a speed change by the continuously-variable transmission 28) is transmitted to the PTO transmission 35, and the motive power changed by the PTO transmission 35 is transmitted to the PTO shaft 36, and is transmitted from the PTO shaft 36 to the working device.

As shown in FIG. 2, a single-acting hydraulic cylinder 37 is provided at the upper part of the rear section of the transmission case 11 (rear case 13), and the lift arm 17 is raised and lowered by the hydraulic cylinder 37.

A hydraulic pump 38 and a control valve 39 are provided inside of the rear section of the transmission case 11 (rear case 13). Lubricating oil stored in the transmission case 11 (rear case 13) is supplied as hydraulic oil to the hydraulic pump 38, and is supplied from the hydraulic pump 38 to the control valve 39. That is, the hydraulic pump 38 pumps the hydraulic oil in an oil circulation circuit 42 in which the oil cooler 41 is provided. The hydraulic oil is cooled by passing through the oil cooler 41.

A pump motor 40 (corresponding to the "second electric motor" of the present invention) is provided at the upper part of the rear section of the transmission case 11 (rear case 13), and the hydraulic pump 38 is driven by the pump motor 40. The inverter 24 converts the DC power of the battery 25 into AC power, which is supplied to the pump motor 40, and thus the pump motor 40 operates.

The hydraulic oil is supplied and discharged to and from the hydraulic cylinder 37 by the control valve 39, and thus the lift arms 17 are raised and lowered by the hydraulic cylinder 37, and the hydraulic oil discharged from the hydraulic cylinder 37 is returned from the control valve 39 to the transmission case 11 (rear case 13).

Configuration of Regeneration Mechanism

Figure 3:
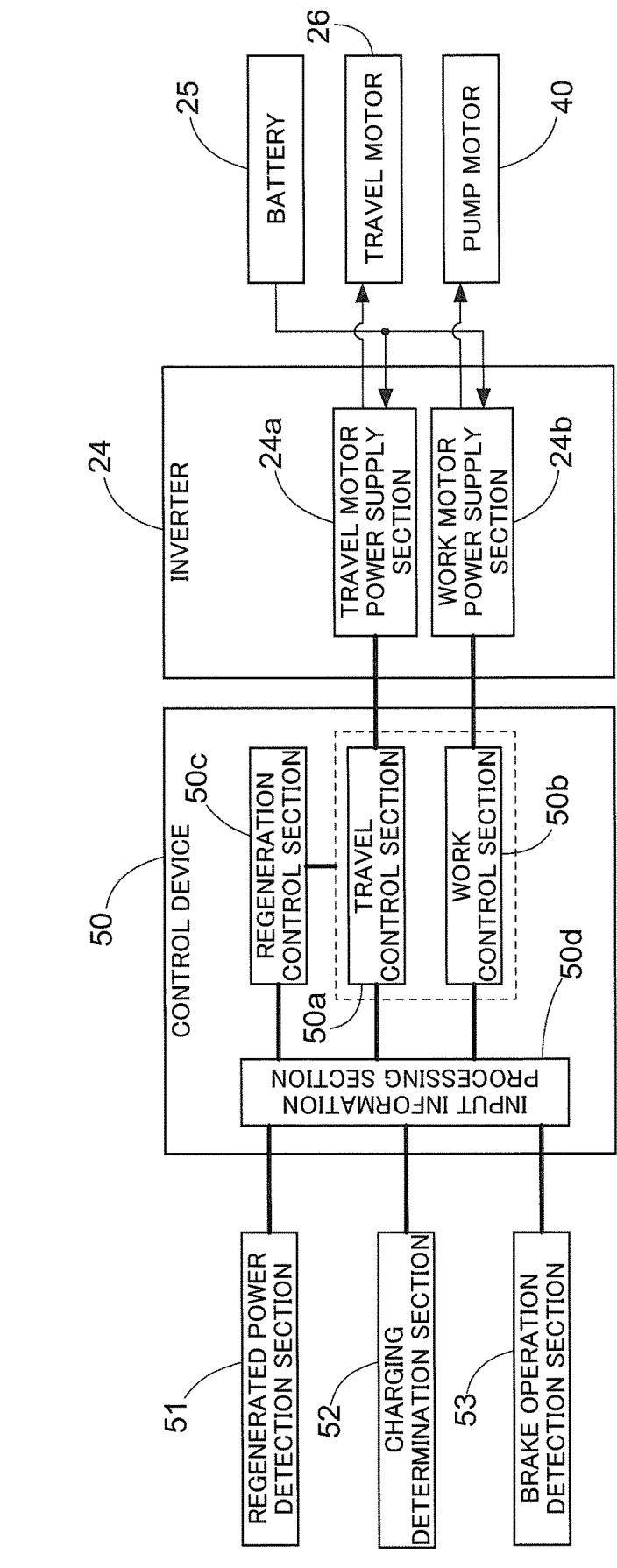
FIG. 3 is a block diagram showing an electrical system of the tractor.

As described above, the travel motor 26 drives the right and left front wheels 1 and the right and left rear wheels 2 via the transmission case 11. As shown in FIG. 3, the travel motor 26 is controlled by a control device 50.

The control device 50 connects a regenerated power detection section 51, a charging determination section 52, and a brake operation detection section 53 as input devices, and the inverter 24 as an output device.

The regenerated power detection section 51 detects generation of regenerated power in the travel motor 26. Although there are various methods for detecting regenerated power, generation of regenerated power may be detected by checking the flow of electric current in a travel motor power supply section 24a of the inverter 24, and generation of regenerated power may be detected using the flow of electric current in the travel motor 26.

The charging determination section 52 detects information relating to the charge state of the battery 25, such as the remaining capacity of the battery 25, and determines whether or not charging of the battery 25 is needed based on the result of detecting the remaining capacity of the battery 25. Specifically, the charging determination section 52 detects the output voltage of the battery 25, and if it is determined that the output voltage is a reference voltage value or less, the charging determination section 52 determines that charging of the battery 25 is needed. By contrast, if it is determined that the output voltage exceeds the reference voltage value or if it is determined that the battery 25 is fully charged, the charging determination section 52 determines that charging of the battery 25 is not needed. Note that the method for detecting the remaining capacity of the battery 25 is not limited to the method of performing determination based on the output voltage, and for example, it is also possible to use a method of detecting the remaining capacity of the battery 25 based on an integrated value of the current of the battery 25.

The brake operation detection section 53 detects operation of a brake pedal BP by the driver. Although not described in detail, for example, the brake operation detection section 53 is constituted by a potentiometer-type brake pedal sensor or the like that detects pivoting of the brake pedal BP.

In the control device 50, a travel control section 50a, a work control section 50b, a regeneration control section 50c, an input information processing section 50d, and the like are constructed by executing a program, but they may also be constructed by hardware, as needed. The input information processing section 50d processes sensor information input from the regenerated power detection section 51, the charging determination section 52, and the brake operation detection section 53 and converts the sensor information into information that can be used inside of the control device 50.

The travel control section 50a performs braking control of the right and left front wheels 1 and the right and left rear wheels 2 based on detection of operation of the brake pedal BP through the brake operation detection section 53. That is, the travel control section 50a controls the travel motor power supply section 24a of the inverter 24 based on detection of operation of the brake pedal BP, stops the supply of power to the travel motor 26, and performs regeneration braking control with the travel motor 26.

In response to generation of regenerated power being detected by the regenerated power detection section 51, the regeneration control section 50c performs control for supplying the regenerated power to the battery 25 or the pump motor 40.

The regeneration control section 50c controls the supply of regenerated power from the travel motor 26 based on the control performed by the charging determination section 52. Specifically, in response to the charging determination section 52 determining that charging of the battery 25 is needed, the regeneration control section 50c performs charging by supplying the regenerated power generated by the regeneration braking control performed by the travel motor 26, to the battery 25. Also, in response to the charging determination section 52 determining that charging of the battery 25 is not needed, the regeneration control section 50c controls the travel motor power supply section 24b of the inverter 24 and performs control such that the regenerated power is supplied to the pump motor 40.

With this configuration, regenerated power is supplied to the pump motor 40 also when it is determined that charging of the battery 25 is not needed, and therefore it is possible to use a regeneration brake to perform braking control such as deceleration, without using a mechanical brake. Also, regenerated power is supplied to the pump motor 40 also when it is determined that charging of the battery 25 is not needed, and therefore it is possible to effectively use the regenerated power.

Other Embodiments

Hereinafter, other embodiments obtained by modifying the above-described embodiment will be illustrated.

(1) In the above-described embodiment, a configuration was described, as an example, in which the charging determination section 52 determines that charging of the battery 25 is not needed in response to the battery 25 being fully charged. However, the present invention is not limited to the above-described embodiment, and the charging determination section 52 may also determine that charging of the battery 25 is not needed in response to detecting that the remaining capacity of the battery 25 is a predetermined remaining capacity or more, except for the full-charged state, and the charging determination section 52 may determine that charging is not needed if a predetermined amount of time has not yet elapsed since the previous instance of charging.

(2) In the above-described embodiment, a configuration was described, as an example, in which the pump motor 40 operates, an operation of supplying or discharging hydraulic oil to or from the hydraulic cylinder 37 is performed, and an operation of raising or lowering the lift arm 17 by the hydraulic cylinder 37 is performed. However, the present invention is not limited to the above-described embodiment, and it is also possible to include a configuration in which, when the tractor is provided with a mower unit, for example, an operation of raising or lowering the mower unit is performed due to the pump motor 40 operating.

(3) In the above-described embodiment, a configuration was described, as an example, in which the charging determination section 52 performs control to supply the regenerated power to the pump motor 40 when it is determined that charging of the battery 25 is not needed, but the present invention is not limited to the above-described embodiment. For example, the charging determination section 52 may also perform control to supply the regenerated power to the water pump motor 22 for driving the water pump 21 when it is determined that charging of the battery 25 is not needed.

Note that the configurations disclosed in the above-described embodiment (including the other embodiments; the same applies hereinafter) can be applied in combination with the configurations disclosed in the other embodiments as long as there is no contradiction. Also, the embodiments disclosed in this specification are illustrative, and the embodiments of the present invention are not limited thereto, and can be modified as appropriate without departing from the object of the present invention.

INDUSTRIAL APPLICABILITY

The present invention can be used in various electric work vehicles, such as a combine, a rice transplanter, or a construction work machine.

LIST OF REFERENCE SIGNS

1 Front wheel (travel device)
2 Rear wheel (travel device)
19 Radiator
21 Water pump
23 Cooling water passage
25 Battery
26 Travel motor (first electric motor)
38 Hydraulic pump
40 Pump motor (second electric motor)
41 Oil cooler
42 Oil circulation circuit
50 Control device
50c Regeneration control section
52 Charging determination section

What is claimed is:

1. An electric work vehicle, comprising:
a travel device;
a first electric motor configured to drive the travel device;
a second electric motor configured to drive a pump;
a battery configured to supply electric power to the first electric motor;
a charging determination section configured to determine whether or not charging of the battery is needed;
a control device configured to control the first electric motor;
a brake operation tool; and a brake operation detection section configured to detect an operation of the brake operation tool, wherein the control device comprises a regeneration control section configured to control regenerated power generated by the first electric motor, wherein in response to the charging determination section determining that charging of the battery is not needed, the regeneration control section performs control to supply the regenerated power from the first electric motor to the second electric motor, wherein if the brake operation detection section detects the operation of the brake operation tool, the control device stops supply of electric power to the first electric motor and makes the first electric motor perform regeneration braking control to generate regenerated power, and wherein the charging determination section detects an output voltage of the battery, and if it is determined that the output voltage exceeds a reference voltage value, the charging determination section determines that charging of the battery is not needed.

2. The electric work vehicle according to claim 1, wherein the pump is a hydraulic pump configured to pump oil in an oil circulation circuit in which an oil cooler is provided, and wherein the second electric motor is an electric motor configured to drive the hydraulic pump.

3. The electric work vehicle according to claim 1, wherein the pump is a water pump configured to pump cooling water in a cooling water passage in which a radiator is provided, and wherein the second electric motor is an electric motor configured to drive the water pump.

* * * * *